(12) United States Patent
Utecht et al.

(10) Patent No.: US 8,197,244 B2
(45) Date of Patent: Jun. 12, 2012

(54) MULTILAYER, FLEXIBLE PLANAR MATERIAL

(75) Inventors: Stefan Utecht, Kaufering (DE); Wilhelm Krings, Laufen (DE); Manfred Hänsch, Ainring (DE)

(73) Assignees: Trans-Textil GmbH, Freilassing (DE); Eads Deutschland GmbH, Ottobrunn (DE)

( * ) Notice: Subject to any disclaimer, the term of this patent is extended or adjusted under 35 U.S.C. 154(b) by 0 days.

(21) Appl. No.: 12/863,758

(22) PCT Filed: Jan. 15, 2009

(86) PCT No.: PCT/EP2009/000222
§ 371 (c)(1),
(2), (4) Date: Jul. 29, 2010

(87) PCT Pub. No.: WO2009/092543
PCT Pub. Date: Jul. 30, 2009

(65) Prior Publication Data
US 2010/0297399 A1 Nov. 25, 2010

(30) Foreign Application Priority Data
Jan. 25, 2008 (DE) .......................... 10 2008 006 261

(51) Int. Cl.
*B29C 70/44* (2006.01)
*B29C 70/48* (2006.01)

(52) U.S. Cl. ...................... 425/389; 425/111; 425/387.1; 425/388; 425/503; 425/504

(58) Field of Classification Search ................... 425/111, 425/112, 387.1, 388, 389, 503, 504; 428/160, 428/315.9
See application file for complete search history.

(56) References Cited

U.S. PATENT DOCUMENTS

| | | | | |
|---|---|---|---|---|
| 3,575,765 A | * | 4/1971 | Maus | 156/332 |
| 3,703,422 A | * | 11/1972 | Yoshino | 156/87 |
| 4,132,755 A | * | 1/1979 | Johnson | 264/553 |
| 4,191,743 A | * | 3/1980 | Klemm et al. | 424/445 |
| 4,562,033 A | * | 12/1985 | Johnson et al. | 264/510 |
| 4,692,369 A | * | 9/1987 | Nomi | 428/198 |
| 4,942,013 A | * | 7/1990 | Palmer et al. | 264/511 |
| 5,021,284 A | * | 6/1991 | Miwa et al. | 428/166 |
| 5,106,568 A | * | 4/1992 | Honka | 264/510 |
| 5,123,985 A | * | 6/1992 | Evans et al. | 156/213 |
| 5,143,763 A | * | 9/1992 | Yamada et al. | 428/36.2 |
| 5,601,852 A | | 2/1997 | Seemann | |

(Continued)

FOREIGN PATENT DOCUMENTS

DE 100 13 409 11/2000

(Continued)

OTHER PUBLICATIONS

International Search Report for PCT/EP2009/000222, mailed Jun. 30, 2009.

(Continued)

*Primary Examiner* — Joseph Del Sole
*Assistant Examiner* — Seyed Masoud Malekzadeh
(74) *Attorney, Agent, or Firm* — Nixon & Vanderhye P.C.

(57) ABSTRACT

A multilayer, flexible planar material for delimiting a matrix supply chamber during the production of fiber-reinforced plastic components made of fiber composite semifinished products includes a multifunction laminate, which has a diaphragm, a textile layer, which is laminated on the diaphragm, and a spacer layer, which is disposed on the textile layer.

10 Claims, 1 Drawing Sheet

U.S. PATENT DOCUMENTS

| | | | |
|---|---|---|---|
| 6,406,659 B1* | 6/2002 | Lang et al. | 264/510 |
| 6,537,483 B1* | 3/2003 | Cartwright et al. | 264/511 |
| 6,818,159 B2* | 11/2004 | Hinz | 264/40.6 |
| 2003/0011094 A1* | 1/2003 | Filsinger et al. | 264/102 |
| 2003/0141293 A1* | 7/2003 | Takeuchi et al. | 219/528 |
| 2004/0017020 A1* | 1/2004 | Loving | 264/134 |
| 2004/0265406 A1* | 12/2004 | Lorenz et al. | 425/110 |

FOREIGN PATENT DOCUMENTS

| | | |
|---|---|---|
| DE | 103 05 544 | 8/2004 |
| DE | 103 54 106 | 6/2005 |
| EP | 1 181 149 | 12/2003 |
| JP | 7-9430 | 2/1995 |
| JP | 9-309968 | 12/1997 |
| JP | 2003-526545 | 9/2003 |

OTHER PUBLICATIONS

Foreign-language Written Opinion of the International Searching Authority for PCT/EP2009/000222, mailed Jun. 30, 2009.

* cited by examiner

MULTILAYER, FLEXIBLE PLANAR MATERIAL

BACKGROUND

This application is the U.S. national phase of International Application No. PCT/EP2009/000222, filed 15 Jan. 2009, which designated the U.S. and claims priority to DE Application No. 10 2008 006 261.8 filed 25 Jan. 2008, the entire contents of each of which are hereby incorporated by reference.

The invention relates to a multilayer, flexible planar material for delimiting a matrix supply space during the production of fibre-reinforced plastic components from fibre composite semifinished products by means of an injection process for injecting matrix material, the planar material having a gas-permeable, but matrix-impermeable diaphragm, a gas-impermeable sheet and also a highly gas-permeable spacer layer which is arranged between the diaphragm and the sheet and holds the sheet at a distance from the diaphragm when a reduced pressure is generated between the diaphragm and sheet.

In the production of fibre-reinforced plastic components, use is made, as is known, of initially dry fibre composite semifinished products ("preforms") which are saturated with free-flowing, curable matrix material in the form of resin. The dry fibre composite semifinished product may in this case be in the form of a woven fabric, a multiaxial ply or a warp-reinforced unidirectional semifinished product and consists in particular of carbon fibres, glass fibres, aramid fibres, boron fibres or hybrid materials.

A process for producing fibre-reinforced plastic components is known as a resin film infusion (RFI) process. In this process, a dry carbon fibre woven fabric or ply is deposited in a curing device and covered from the outside with a defined amount of resin film. Subsequently, the plastic component, which consists of the carbon fibres and the resin, is cured in an autoclave or another pressurised vessel under pressure and temperature. However, the use of pressurised vessels and the complex tools necessary for this purpose are very costly. Furthermore, a process of this type is difficult to handle with regard to temperatures and pressures. In addition, the available autoclaves limit the size of the plastic components to be produced.

In order to avoid these drawbacks, a process which is described in DE 100 13 409 C1 and is referred to as a "VAP" (vacuum assisted process) has already been developed. In this process a multilayer, flexible planar material is used to delimit a matrix supply space in which the semifinished product is arranged. In the prior development, the planar material consists of a plurality of layers which are separate from one another and can be handled independently of one another, namely the gas-permeable, but matrix-impermeable diaphragm, a highly gas-permeable spacer layer and also a gas-impermeable sheet. These layers are individually placed, one after another, over a flow aid layer which is placed onto the semifinished product. If the region between the sheet and the diaphragm is now evacuated and a reduced pressure is as a result built up, the pressure is accordingly reduced through the diaphragm even in the interior matrix supply space, as a result of which liquid resin is drawn out of an external resin container into the matrix supply space. Although the diaphragm in this case allows gases to escape from the matrix supply space into the spacer layer and from there toward the exterior, it at the same time retains the resin in the matrix supply space, so the resin can infiltrate the semifinished product.

Although this VAP has considerable advantages over the processes using autoclaves, the fact that each individual layer of the planar material, namely the diaphragm, the spacer layer and also the gas-impermeable sheet, has to be successively placed over the semifinished product very exactly and in a stress-free manner is somewhat problematic. This is correspondingly time-consuming and can, if it is not carried out with corresponding precision, adversely influence process safety and lead to non-uniform accumulations of matrix material.

SUMMARY

The invention is therefore based on the object of providing a multilayer, flexible planar material of the type mentioned at the outset allowing the VAP to be carried out in a manner which is as simple, rapid, cost-effective and precise as possible.

In the planar material according to the invention, the diaphragm, a textile layer, which is laminated onto the diaphragm, and also the spacer layer, which is arranged on the textile layer, are jointly embodied as a multifunctional laminate and as a result securely connected to one another. The term "multifunctional laminate" refers in this case to the fact that a laminate is produced that is made up of a plurality of specific layers and performs simultaneously a plurality of functions, namely on the one hand the function of the diaphragm, which lets through gas but is impermeable to the matrix material, and on the other hand the function of the spacer layer which holds the gas-impermeable sheet at a distance from the diaphragm when a reduced pressure is generated between the diaphragm and sheet, so the space between the diaphragm and the sheet remains open.

As a result of the secure connection of the individual layers to form a laminate, it is no longer necessary to apply these layers individually, one after another. Instead, this can be carried out in a single operation. This considerably shortens the working time for arranging the planar material over the semifinished product. Furthermore, there is no risk of the individual layers of the planar material not being properly arranged one above another in a stress-free manner. Process safety and precision are increased as a result. Production and material costs can be reduced.

According to an advantageous embodiment, the sheet is securely connected to the spacer layer, so the sheet is also part of the multifunctional laminate. In this case, the multifunctional laminate performs the additional function of outwardly sealing in an air-tight manner the matrix supply space including the adjacent layers of the multifunctional laminate, so the space enclosed by the sheet can be effectively evacuated. A multifunctional laminate of this type again shortens the time it takes to arrange the planar material over the semifinished product and additionally ensures that the sheet is properly arranged over the spacer layer in a stress-free manner.

According to an advantageous embodiment, the spacer layer has a large number of individual spacers embodied in the form of elevations. The spacers can in this case be purposefully attached in such a way as to optimise the flow of gas through between the spacers, parallel to the diaphragm or to the sheet. Alternatively thereto, it is however also possible to use highly gas-impermeable woven fabrics, knitted fabrics, braids or other materials for the spacer layer.

BRIEF DESCRIPTION OF THE DRAWINGS

The invention will be described hereinafter in greater detail by way of example with reference to the drawings, in which.

DETAILED DESCRIPTION

The VAP technology according to the prior art will firstly be described in greater detail with reference to the device from FIG. 1.

Figure 1:
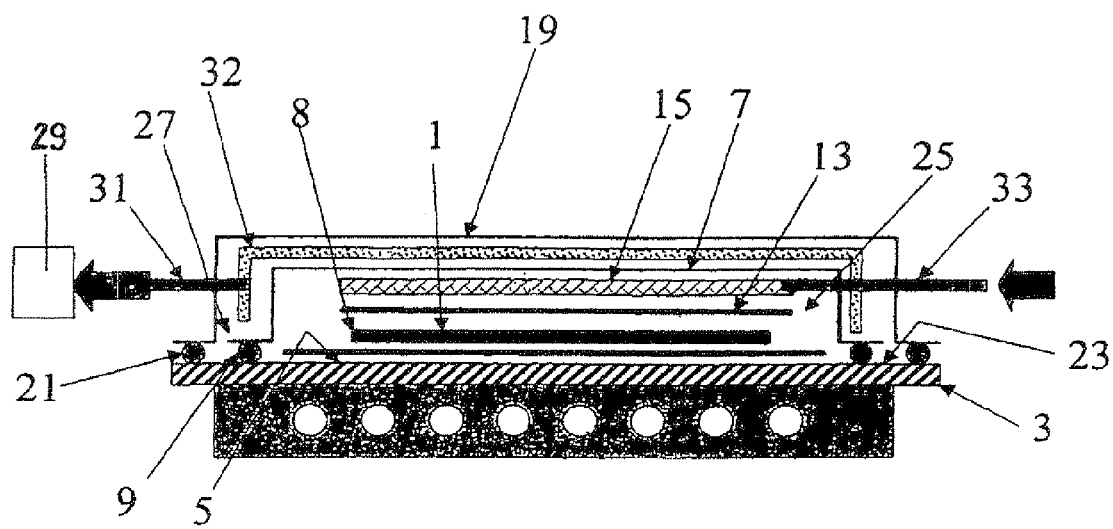
FIG. 1 is a section through a device for producing fibre-reinforced plastic components in order to illustrate the VAP according to the prior art.

The device shown in FIG. 1 displays a component to be produced or dry fibre composite semifinished product 1 which is arranged on a mould 3, for example by means of a construction 5. The component or laminate may in this case be a plastic component made of carbon fibres (CFRP), glass fibres (GFRP), aramid fibres (AFRP), boron fibres (BFRP) or hybrid materials and be used in particular for producing non-stiffened and stiffened, extensive panels, plastic tools or for tapered overlap repairs of damaged fibre composite components. The mould 3 has a shape which is suitable for accommodating the semifinished product 1 or if appropriate the construction 5 and can be formed from various suitable materials, for example wood, steel, sheet metal, glass and the like.

The component is covered by a semipermeable diaphragm 7 which is gas-impermeable, but prevents matrix material from passing through. The diaphragm 7 is sealed outside the circumferential surface 8, but as close as possible to the component 1, by means of a seal 9 which is used to seal the inner space 25 formed by the diaphragm 7 and the rest 5 or the mould surface 3. Alternatively, the diaphragm 7 can also be guided all the way around the component. Between the component 1 and the diaphragm 7, a tear-off woven fabric 13 (optional) and a flow aid 15, the purpose of which is to hold the diaphragm 7 at a distance from the surface of the component 1, can be arranged over the entire surface of the component 1 that faces the diaphragm 7. The flow aid 15 may be a type of grate or grid or else a rigid woven fabric or knitted fabric or braid which is not highly compactable under vacuum and is made for example of metal, plastics or textile semifinished products.

The arrangement made up of the construction 5, fibre composite semifinished product 1, diaphragm 7 with the seal 9 and also with the tear-off woven fabric 13 and flow aid 15 is covered by a sheet 19 which is gas-impermeable. The sheet is sealed around the circumference of the diaphragm 7 with a seal 21 on the mould 3, so the space 27 formed by the surface 23 of the mould 3 and the inner wall of the sheet 19 is tightly sealed from the environment. A spacer layer in the form of a ventilator woven fabric 32, which may for example be a glass woven fabric, a formed fabric or the like, is inserted between the sheet 19 and the diaphragm 7. The purpose of this ventilator woven fabric 32 is to guide the air and gases, which are drawn out of the space 27 inter alia through the diaphragm 7, along the diaphragm surface and in the process to hold the sheet 19 at a distance from the diaphragm 7 when the space is evacuated by means of a vacuum pump 29 and a corresponding gas line 31 leading into the inner space 27.

For introducing matrix material into the component 1, hoses or lines 33, which are connected to a resin supply container (not shown), lead to the flow aid 15. The inner space 25 is thus a matrix supply space.

The fibre-reinforced plastic component 1 is produced in the known method in that the dry fibre composite semifinished product is firstly positioned in accordance with design requirements and a laminate construction is thus formed from the individual layers of the semifinished product. The mould 3 is sprayed with release agent, i.e. pretreated by means of release agent or release film and tear-off woven fabric (together, it forms the construction 5 on the underside of the component 1), in order to prevent the matrix material from sticking to the mould 3 and to allow the component to be removed (demoulded) from the mould surface. The dry semifinished product of the component 1 is preferably provided with the tear-off woven fabric 13. In addition, the flow aid 15 is attached above this construction by simple application. The diaphragm 7, which is permeable only to air, but not to liquids, is applied to this flow aid 15 and sealed by means of the seal 21. Subsequently, the ventilator woven fabric 32 is placed over the diaphragm 7 and sealed from the environment by means of the sheet 19 and the seal 21. The matrix supply line 33 and the vacuum line 29 are arranged during this process with conventional commercial sleeves and seals according to FIG. 1.

After the attachment of the aforementioned materials and the air-impermeable sheet 19, the space 27 is evacuated by means of the vacuum pump 29. At the same time, a matrix material storage container is connected to the system in order to introduce matrix material into the inner space 25. The vacuum produces a drop in pressure which draws the matrix material out of the storage container into the evacuated inner space 25. The matrix material is now divided by the flow aid 15 and the feed line 33 on the surface of the component. Air which is present is in this case removed as a result of the permanent suction extraction of the inner space 25 through the diaphragm 7. In this case, matrix material infiltrates the laminate perpendicularly downward from the surface of the component. As soon as complete saturation has been concluded, the curing is carried out by way of a suitable temperature while maintaining the same vacuum. The bubbles which are in this case produced as a result of the chemical process are discharged through the diaphragm 7.

After curing has been carried out, the component is demoulded, all the process auxiliaries being removed by hand and the component also ultimately being removed from the mould 3.

The foregoing discussion reveals that, in the known process described with reference to FIG. 1, the diaphragm 7, the ventilator woven fabric 32 acting as a spacer layer, and the air-impermeable sheet 19 have to be arranged individually and successively over the component 1 or the flow aid 15; this is time-consuming and impairs process safety.

A first embodiment of the planar material according to the invention will be described hereinafter with reference to FIG. 2.

This planar material is a multifunctional laminate 40 which performs the functions of the diaphragm 7 illustrated in FIG. 1 and of the ventilator woven fabric 32. The multifunctional laminate 40 consists of a diaphragm 41, a textile layer 42 and a spacer layer 43.

The diaphragm 41 is a semipermeable, microporous, hydrophobic polyurethane diaphragm which can be used in low-temperature and high-temperature VAP technology, or a semipermeable, microporous, hydrophobic ePTFE diaphragm which is used in particular in a high-temperature VAP. The multifunctional laminate 40 is arranged, in accordance with the construction from FIG. 1, over the semifinished product 1 or if appropriate over the flow aid 15 (FIG. 1) in such a way that the diaphragm 41 rests on the side of the multifunctional laminate 40 that faces the semifinished product 1. The diaphragm 41 is impermeable to the matrix material (resin) which is introduced into the inner space 25, but permeable to gases, so even the inner space 25 can be evacuated through the diaphragm 41 and gases can issue through the diaphragm 41.

The textile layer 42, which is laminated onto the diaphragm 41, serves primarily to reinforce the diaphragm 41. The textile layer 42 can consist of a woven fabric, knitted fabric, formed fabric or knitted article. Polyester, polyamide, aramid or polypropylene may in particular be used as the material for the textile layer 42. In any case, the textile layer 42 is embodied in such a way that the gas permeability of the diaphragm 41 is not influenced in an undesired manner. The diaphragm 41 and the textile layer 42 can be connected to each other by a lamination process in which a moisture-crosslinking polyurethane adhesive system or conventional thermal adhesives are used. The adhesive can in this case also be applied in a point-by-point manner in order to impair the gas permeability of the diaphragm 41 as little as possible.

The spacer layer 43 performs the task of the ventilator woven fabric 32 (FIG. 1) and is embodied in such a way that a gas-impermeable sheet 44, which is attached to the spacer layer 43, is held at a distance from the textile layer 42 when the space between the sheet 44 and the textile layer 42 (or diaphragm 41) is evacuated. In the exemplary embodiment of FIG. 2, the spacer layer 43 consists of individual spacers 45 which are separate from one another and are arranged set apart from one another on the textile layer 43. The height of the spacer layer 43 may be between 170 µm and 1,000 µm. The spacers 45 are arranged in such a way that, during the evacuation of the space 27 (FIG. 1), the gases can flow through in as unimpeded a manner as possible between the spacers 45, parallel to the main plane of the multifunctional laminate 40. The spacers 45 may for example be foam pimples. Furthermore, it is also possible for the spacer layer 43 to consist of highly gas-permeable textile woven fabric, knitted fabric or braids. The spacer layer 43 is securely connected to the textile layer 42, wherein conventional adhesive technologies can be used as depending on the material.

Figure 2:
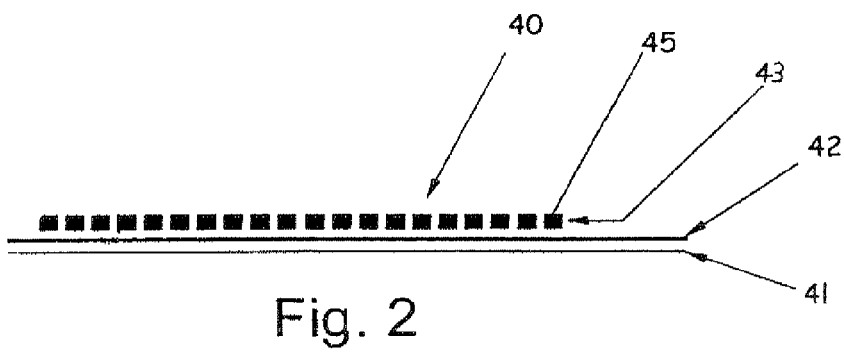
FIG. 2 is a schematic illustration of a first embodiment of the planar material according to the invention, the individual layers being shown set apart from one another merely for the sake of clarity.

The multifunctional laminate 40 shown in FIG. 2 thus consists of a solid composite consisting of the diaphragm 41, textile layer 42 and spacer layer 43. In this embodiment, it is also necessary to subsequently place the air-impermeable sheet 44 shown in FIG. 3 onto the spacer layer 43.

Figure 3:
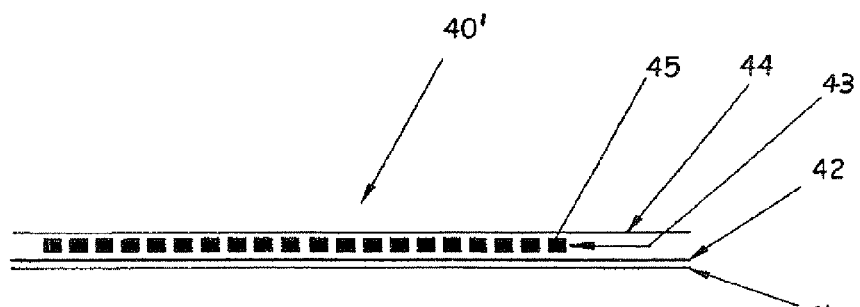
FIG. 3 is a schematic illustration of a second embodiment of the planar material according to the invention, the individual layers being shown set apart from one another merely for the sake of clarity.

FIG. 3 shows a second embodiment of a multifunctional laminate 40' according to the invention that differs from the embodiment illustrated in FIG. 2 merely in that the gas-impermeable sheet 44 is already a fixed component of the multifunctional laminate 40'. The sheet 44 is in this case securely fixed, in particular adhesively bonded, to the upper side of the spacer layer 43 or the spacers 45 and forms as a result a fourth laminate layer. The remainder of the construction of the multifunctional laminate 40', namely the diaphragm 41, textile layer 42 and spacer layer 43, is identical to that of FIG. 2, so reference is made in this regard to the section of the present document describing FIG. 2.

The multifunctional laminate 40' has the advantage over the multifunctional laminate 40 that even the separate subsequent manual application of the gas-impermeable sheet 44 is dispensed with, thus speeding up the sealing of the space 27 to be evacuated from the external environment and ensuring that the sheet 44 lies optimally on the spacer layer 43.

The invention claimed is:

1. Multilayer, flexible planar material for delimiting a matrix supply space during the production of fibre-reinforced plastic components from fibre composite semifinished products by means of an injection process for injecting matrix material, the planar material having a gas-permeable, but matrix-impermeable diaphragm, a gas-impermeable sheet and also a highly gas-permeable spacer layer which is arranged between the diaphragm and the sheet and holds the sheet at a distance from the diaphragm when a reduced pressure is generated between the diaphragm and sheet, wherein:
   the diaphragm consists of a microporous polyurethane diaphragm or microporous ePTFE diaphragm onto which a textile layer reinforcing the diaphragm is laminated,
   the spacer layer is arranged on the textile layer, and
   the microporous diaphragm, the textile layer and the spacer layer are jointly embodied as a multifunctional laminate and as a result are securely connected to one another prior to delimiting the matrix supply space such that the microporous diaphragm, the textile layer and the spacer layer as the multifunctional laminate simultaneously delimit the matrix supply space and such that the multifunctional laminate is removable after production of the fibre-reinforced plastic components.

2. Planar material according to claim 1, wherein the sheet is securely connected to the spacer layer, such that the sheet is also part of the multifunctional laminate.

3. Planar material according to claim 1, wherein the spacer layer has a large number of individual spacers embodied in the form of elevations.

4. Planar material according to claim 1, wherein the spacer layer has a thickness of 170 to 1,000 µm.

5. Multilayer flexible planar material for delimiting a matrix supply space during the production of fibre-reinforced plastic components from fibre composite semifinished products by means of an injection process for injecting matrix material, the planar material comprising:
   a gas-permeable matrix-impermeable diaphragm formed as a microporous polyurethane diaphragm or microporous ePTFE diaphragm;
   a textile layer laminated on the diaphragm;
   a gas impermeable sheet; and
   a gas-permeable spacer layer arranged on the textile layer between the diaphragm and the sheet, the spacer layer holding the sheet at a distance from the diaphragm,
   wherein the diaphragm, the textile layer and the spacer layer are jointly embodied as a multifunctional laminate securely connected to one another into an independent unit prior to delimiting the matrix supply space such that the multifunctional laminate is independently applicable to delimit the matrix supply space and such that the multifunctional laminate is removable after production of the fibre-reinforced plastic components.

6. Planar material according to claim 5, wherein the sheet is securely connected to the spacer layer, such that the sheet is also part of the multifunctional laminate.

7. Planar material according to claim 5, wherein the spacer layer has a large number of individual spacers embodied in the form of elevations.

8. Planar material according to claim 5, wherein the spacer layer has a thickness of 170 to 1,000 µm.

9. Planar material according to claim 1, wherein the microporous diaphragm comprises a semipermeable hydrophobic diaphragm.

10. Planar material according to claim 1, wherein the spacer layer comprises a plurality of individual spacers arranged set apart from one another on the textile layer.

* * * * *